United States Patent Office 3,377,390
Patented Apr. 9, 1968

3,377,390
IODOPERFLUOROALKANE FLUORIDES AND THEIR USE TO PROMOTE TELOMERIZATION OF IODOPERFLUOROALKANES WITH OLEFINS
Christian Scriver Rondestvedt, Jr., Foulk Woods, Wilmington, Del., assignor to E. I. du Pont de Nemours and Company, Wilmington, Del., a corporation of Delaware
No Drawing. Filed May 2, 1966, Ser. No. 546,523
11 Claims. (Cl. 260—653)

ABSTRACT OF THE DISCLOSURE

The present invention is directed to compounds of the structure $R_fIF_x$ where $x$ is an integer of two or four and the use of these compounds to promote telomerization of perfluoroalkyl iodides $R'_fI$ with olefins $R_f$ is a perfluoroalkyl group.

BACKGROUND OF THE INVENTION

U.S. Patent 3,234,294 has disclosed that perfluoroalkyl iodides $R'_fI$ will telomerize with tetrafluoroethylene in the presence of iodine pentafluoride and either antimony pentafluoride, antimony trifluoride or antimony pentachloride, from 0.005 to 0.1 mole of the former and from 0.0025–0.01 mole of one of the latter per mole of perfluoroalkyl iodide being required. While this process represents a useful commercial method for telomerization of perfluoroalkyl iodides with tetrafluoroethylene, it suffers from two defects. First, it requires the use of iodine pentafluoride which, under the reaction conditions is known to convert fair quantities of perfluoroalkyl iodides to perfluoroalkanes and iodine. The iodine can react with tetrafluoroethylene to form the diiodide which can then telomerize to longer chain diiodides. Both the perfluoroalkane and diiodide by-products are undesirable, but are found in the products of this U.S. patent process in small amounts. Second, both iodine pentafluoride and the antimony halides are corrosive.

Other known methods for telomerizing perfluoroalkyl iodides with tetrafluoroethylene have serious deficiencies. Photochemical and thermal methods give much larger amounts of by-products than U.S. Patent 3,234,294. Free radical generating compounds cause formation of different but equally undesirable by-products.

It is, therefore, an object of this invention to provide novel perfluoroalkyl iodides. It is a further object of the present invention to provide a unique process for telomerizing perfluoroalkyl iodides with olefins using such initiators.

These and other objects of the invention will become apparent from the following description and claims.

SUMMARY OF THE INVENTION

More specifically, the present invention is directed to novel products having the empirical formula $R_fIF_x$ wherein $R_f$ is a perfluoroalkyl group of from two to about 22 carbons and $x$ is an integer of two or four.

The present invention also encompasses a process for preparing telomers of perfluoroalkyl iodides which comprises contacting a perfluoroalkyl iodide $R'_fI$ with an olefin $(R^1)_2C=CR^1R^2$ in the presence of an initiator of empirical formula $R_fIF_x$ and optionally an inert solvent, at from about $-40°$ to about $140°$ C.; and recovering telomers of structure $R'_f[C(R^1)_2CR^1R^2]_rI$ from the reaction mixture; wherein $R_f$ and $R'_f$ are each perfluoroalkyl groups of two to about 22 carbons, each $R^1$ is hydrogen or fluorine, $R^2$ is hydrogen, fluorine, polyfluoroalkyl or alkyl, $x$ is an integer of 2 or 4 and $r$ is an integer of at least one. Preferred embodiments include such a telomerization process (1) wherein $R_fIF_x$ is $R_fIF_2$, particularly $C_2F_5IF_2$ or $C_4F_9IF_2$, and, (2) such a process wherein $(R^1)_2C=CR^1R^2$ is tetrafluoroethylene.

The present invention is based on two related discoveries, namely (1) that perfluoroalkyl iodides $R_fI$ will react with certain fluorinating agents to form products of empirical formula $R_fIF_x$ and (2) that these products $R_fIF_x$ will initiate the telomerization of perfluoroalkyl iodides with certain olefins.

DESCRIPTION OF THE INVENTION

Preparation and properties of $R_fIF_x$

Perfluoroalkyl iodides $R_fI$ will react with certain fluorinating agents to form products of empirical formula $R_fIF_x$ where $x$ is 2 or 4. Either $R_fIF_2$, $R_fIF_4$ or mixtures thereof can be produced. The reaction appears to involve fluorination of the iodine atom, the presence of —I—F bonds in the product is established. Chlorine trifluoride gives either $R_fIF_2$ or $R_fIF_4$, depending on the relative amount used, $R_fIF_4$ can also be prepared using bromine trifluoride or bromine pentafluoride but attempts to prepare $R_fIF_2$ with these reagents has always led to mixtures of $R_fIF_2$ and $R_fIF_4$. Other fluorinating agents, e.g., ClF, IF, $SbF_5$, $IF_5$, do not appear to be useful for preparation of $R_fIF_x$.

The process for preparing $R_fIF_x$ is carried out at from $-110°$ C. to about $0°$ C. At temperatures below $-110°$ C., reaction rates are unsatisfactorily slow. At temperatures above about $0°$ C. secondary reactions occur, primarily the conversion of $R_fI$ to $R_fF$. Any convenient reaction pressure may be used.

It is generally desirable to use no more than the amount of fluorinating agent required by the stoichiometry to avoid side reactions. The stoichiometric equations are as follows:

$$3R_fI + 2ClF_3 \rightarrow 3R_fIF_2 + Cl_2$$
$$3R_fI + 4ClF_3 \rightarrow 3R_fIF_4 + 2Cl_2$$
$$3R_fI + 2BrF_3 \rightarrow 3R_fIF_2 + Br_2$$
$$3R_fI + 4BrF_3 \rightarrow 3R_fIF_4 + 2Br_2$$
$$5R_fI + 2BrF_5 \rightarrow 5R_fIF_2 + Br_2$$
$$5R_fI + 4BrF_5 \rightarrow 5R_fIF_4 + 2Br_2$$

Another way of stating the above is that a deficiency of the perfluoroalkyl iodide should never be used if $R_fIF_2$ is to be prepared. A small excess of fluorinating agent is not harmful in the preparation of $R_fIF_4$.

Any perfluoroalkyl iodide containing from two to twenty-two carbons may be used to obtain $R_fIF_2$ and $R_fIF_4$. The iodine atom may be attached to a primary carbon, i.e.,

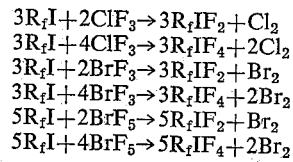

to a secondary carbon, e.g., $C_mF_{2m+1}CFIC_nF_{2n+1}$, or to a tertiary carbon, e.g.,

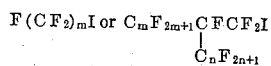

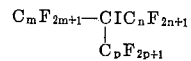

The perfluoroalkyl iodide starting materials are available from a wide variety of sources. One convenient source is the addition of the element of IF to perfluoroolefines [Hauptschein et al., USP 3,006,973]. Another source is reaction of lower perfluoroalkyl iodides with perfluoroolefines (Parsons loc. cit., Haszeldine, J. Chem. Soc., 1949, 2856; Hauptschein et al., J.A.C.S., 79, 2549 (1957)), decomposition of silver salts of perfluorocarboxylic acids in the presence of iodine (Haszeldine, J. Chem. Soc., 1952, 4259; Brice and Simons, J.A.C.S., 73, 4016 (1951)), the telomerization as described hereinafter, or of decomposition of perfluoro acid chlorides in the presence of potassium iodide (Krespan, J. Org. Chem., 23, 2016 (1958)).

Broadly, the present process is carried out by contacting the perfluoroalkyl iodide $R_fI$ with the fluorinating agent (as herein identified) at less than 0° C. under anhydrous conditions with agitation. The method of bringing the two reagents together, the desirability of solvents and the like vary somewhat with the fluorinating agent being used as is further discussed below.

An inert diluent or solvent may be utilized. Such solvents must naturally be inert, at least under the reaction conditions maintained. The perfluoroalkanes and perchlorofluoroalkanes, and in particular perfluorohexane have been found to be useful solvents. Other useful solvents include perfluorocyclobutane, perfluorooctane, perfluorobutane, and like compounds. Generally, rather dilute solutions of the perfluoroalkyl iodide are used, say in the range of 5% to 35% by weight.

Chlorine trifluoride is a liquid (B.P. 11.3° C.) under the reaction conditions. Perfluoroalkyl iodides can then be contacted with liquid chlorine trifluoride. It has been found preferable to add the required amount of liquid chlorine trifluoride with care and agitation to the perfluoroalkyl iodide, the latter being maintained within the temperature range indicated above. The rate of addition must be carefully controlled since the reaction is highly exothermic. Although not required, solvents have been found desirable in this process.

Alternatively, chlorine trifluoride may be vaporized, combined with an inert gas carrier such as nitrogen, helium, argon, neon, or carbon tetrafluoride and the resulting gaseous mixture passed into the agitated perfluoroalkyl iodide, pure or as a solution. Good dispersion of the gaseous material in the liquid material is again desirable.

Chlorine trifluoride should not be contacted with perfluoroalkyl iodides in the vapor phase, particularly at ordinary temperatures. Flashes of fire and small explosions result and the desired products are not obtained.

Both bromine trifluoride and bromine pentafluoride are liquids at ordinary temperatures, having boiling points of 127° C. and 40.5° C. respectively. They are used in essentially the same manner as liquid chlorine trifluoride, as described above. Both bromine trifluoride and bromine pentafluoride are somewhat less reactive than chlorine trifluoride. Care should be taken not to be deceived by an apparent lack of reactivity at near −70° C. Warming of the reaction mixture to −50° to −20° C. leads to rapid and vigorous reaction, at times violent.

The fluorination reaction may be carried out in any type of equipment which is resistant to the action of the fluorinating agents. Glass, copper, nickel, or the high nickel alloys such as "Inconel" or "Monel" have been found suitable. Great care should be taken to insure complete freedom of the equipment from water and any organic matter containing hydrogen. As is well known, these fluorinating agents can react violently with both water and organic matter. Volume I of Simons "Fluorine Chemistry" contains valuable information on the handling of such fluorinating agents.

Good agitation is distinctly desirable in this process, not only to insure good contact of reactants but also to prevent locally high concentrations of fluorinating agent. Such high concentrations could lead to hazardous conditions.

The reaction system should be provided with sufficient cooling means to remove any heat of reaction which might evolve, or at the very least to maintain control of the system.

The products of the present process are usually solids. Some of the solids are rather low melting, say 0° to 20° C. and hence may occur as liquids. The product may be isolated in a relatively pure state by evaporation of the solvent (if used), by-product chlorine or bromine (if they occur) and any unreacted starting materials under reduced pressure and generally at less than 0° C. For some purposes, it is not necessary to isolate the products.

Both $R_fIF_2$ and $R_fIF_4$ may have an appreciable vapor pressure, at least where $R_f$ contains less than 10 carbons.

These products undergo some decomposition on either heating or standing although storage lives of several weeks or months have been observed. These products have as their principal known utility the ability to initiate telomerization of perfluoroalkyl iodides with olefines, as described hereinbelow.

The products of empirical formula $R_fIF_2$ and $R_fIF_4$ appear to occur in two forms, low melting and higher melting. Both types have the same formula. The low melting forms are soluble in the perfluoroalkanes or in perfluoroalkyl iodides. The high melting forms seem to be insoluble in these nonionizing solvents but are soluble in methanol or pyridine. Both forms are active in initiating telomerization of perfluoroalkyl iodides with olefines.

The low melting forms usually melt in the range of 0° to 49° C. Nuclear magnetic resonance spectra of the low melting forms confirms that they have the structure $R_f$—I—$F_2$ and $R_f$—I—$F_4$, that is, compounds wherein a perfluoroalkyl group and two or four fluorine atoms are covalently bonded to the iodine atom. The high melting forms (melting points of 200° C. or above), being insoluble, cannot be characterized by nuclear magnetic resonance. Other available spectral methods have not, to date, given any useful information. The X-ray diffraction patterns of the crystalline high melting forms indicate that the unit cells of the crystal have volumes of twice that of $R_fI$ itself. While this could be due to a crystal cell containing two molecules of $R_fIF_x$, this is not likely. The high melting forms would then be polymorphs of the low melting forms; such widely separated melting points are not usually observed among polymorphs. The high melting points and lack of solubility in the perfluoroalkane solvents indicate different chemical species. It is possible that the high melting forms of compounds of empirical formula $R_fIF_x$ are actually the ionic species $[R_f$—I—$R_f]^+[IF_{2x}]^-$; the high melting points and lack of solubility certainly suggest such. The empirical formulas of $R_f$—I—$F_x$ and $[R_f$—I—$R_f]^+[IF_{2x}]^-$ are, of course, identical. In any case, both the low and high melting forms of compounds of empirical formula $R_fIF_x$ are within the scope of this invention.

Schmeisser, in Angew. Chem., 71, 524 (1959), has reported reaction of trifluoromethyl iodide with fluorine in monofluorotrichloromethane solution at −80° C. He obtained a white solid of apparently high melting point which decomposed rapidly, even near 0° C. Schmeisser considered the solid to be $CF_3IF_2$. Schmeisser's work has been repeated and the solid isolated. It has an empirical formula corresponding to $CF_3IF_2$. Schmeisser's product differs in kind, however, from those of this invention having empirical formulae of $R_1IF_2$, Schmeisser's product is unlike the low melting forms of $R_fIF_2$, e.g., $C_2F_5IF_2$, in that the latter have low melting points ($C_2F_5IF_2$ at 18° C.) and are readily soluble in nonpolar solvents while Schmeisser's product has a considerably higher melting point (51° C. is reported but there is some question whether this is a true melting point) and is insoluble in nonpolar solvents. It likewise does not correspond to the high melting forms of $R_fIF_2$, although solubility properties are similar, since Schmeisser's product, while stable at 0° C. decomposes at room temperature whereas the high melting forms of $R_fIF_2$ do not decompose appreciably until near their melting points of 200° C. or more. The difference in kind is further demonstrated by the fact that both the low and high melting forms of $R_fIF_2$ catalyze or initiate telomerization of perfluoroalkyl iodides with olefins whereas Schmeisser's product does not. Neither solubility nor melting points are the cause since the high melting forms of $R_1IF_2$, although apparently insoluble, nevertheless initiate the reaction.

It thus appears that either Schmeisser's product is not $CF_3IF_2$ in either low or high melting form although no evidence is available to substantiate such conjecture at present, or there is a fundamental difference in kind between $CF_3IF_2$ and the product $C_2F_5IF_2$ containing even a single additional carbon atom. While $CF_3I$ and $C_2F_5I$ differ in degree in their ability to undergo telomerization reactions and similar reactions, they do not differ in kind. Hence there is no reason to expect $CF_3IF_2$ to differ from $C_2F_5IF_2$ in kind.

Other compounds containing the group —$IF_2$ are known, for example, the phenyl derivative $C_6H_5IF_2$. This compound also does not initiate telomerization. Compounds $C_nH_{2n+1}IF_x$ are unknown.

In the product $R_fIF_x$, $R_f$ is, as indicated earlier, a perfluoroalkyl group $C_nF_{2n+1}$. These products then contain $2n+x+1$ fluorines. Of these, $x$ fluorines are hydrolyzable while $2n+1$ are not in both the low and high melting forms. Hydrolysis is readily carried out by dissolving the products in methanol and slowly adding water. Fluoride ion is produced; the nature of the other product or products has not been determined.

The telomerization process

The telomerization process of this invention consists of bringing together a perfluoroalkyl iodide telogen $R'_fI$ and an olefin $(R^1)_2C=CR^1R^2$ in the presence of an initiator of empirical formula $R_fIF_x$ to give products of formula $R'_f[C(R^1)_2CR^1R^2]_rI$ wherein $r$ is an integer of at least one which may be as high as ten or more. The process is carried out at temperatures of from —40° C. to about 200° C., autogenous pressure and reasonably anhydrous conditions. The preferred temperatures are in the range of 60° to 100° C. A preferred form of operation consists of dissolving or suspending the initiator $R_fIF_x$ in the telogen $R'_fI$, heating the mixture to the desired reaction temperature and then adding olefin, all under autogenous pressure, until either the desired amount of olefin has been added or reaction ceases. Autogenous pressures are used because many of the useful olefins and telogens are relatively low boiling materials. Of course, under certain circumstances, autogenous pressure could also be atmospheric pressure. Anhydrous conditions are necessary because, as noted earlier, the initiators $R_fIF_x$ are hydrolyzed by water.

The perfluoroalkyl iodide telogens $R'_fI$ are any available perfluoroalkyl iodides containing from two to twenty-two carbons, i.e. the same groups of iodides as discussed in relation to the perfluoroalkyl iodides $R_fI$ used to prepare the initiators $R_fIF_x$. The perfluoroalkyl groups $R_f$ in the initiator $R_fIF_x$ and the telogen $R'_fI$ may be the same or different. The initiator $R_fIF_x$ may be prepared separately and added to the telogen or may be prepared by adding the required amount of fluorinating agent to the large excess of telogen, thus forming the initator in the reaction vessel. The latter method is quite useful if $R_f$ and $R'_f$ are to be the same.

The useful olefins $C(R^1)_2=CR^1R^2$ are those wherein each $R^1$ is hydrogen or fluorine and $R^2$ is hydrogen, fluorine, polyfluoroalkyl or alkyl. Although there is no practical limit on the number of carbons in these olefines, it is preferable that they contain five carbons or less. Useful olefines include tetrafluoroethylene, ethylene, vinyl fluoride, vinylidene fluoride, 3,3,3-trifluoro-1-propene, pentafluoroethylethylene, n-heptafluoropropylethylene, propylene, 1-butene, 1-pentene, trifluoroethylene, hexafluoropropylene, perfluoro-1-butene and the like.

The minimum amount of initiator $R_fIF_x$ required is about 0.01 mole percent, based on telogen $R'_fI$. As much as 10 mole percent has been used, there is no upper limit. The reaction rate is affected by the relative concentration of $R_fIF_x$, the concentration of olefin, the temperature and the nature of $R'_fI$, $R_fIF_x$ and the olefin themselves. Since the telomerization reaction can be highly exothermic, care should be taken with high concentrations of initiator $R_fIF_x$. It is better to start with lower concentrations to determine the ability of the reaction system to handle the heat of reaction. With experience, the catalyst concentration can then be increased.

Reaction temperatures of from —40° to about 140° C. may be used. Below —40°, the reaction rates become impractically slow. Above about 140° C., serious side reactions become important. Usually 60° to 100° C. is the preferred temperature range.

Compounds of both empirical formula $R_fIF_2$ and $R_fIF_4$ may be used as initiators. $R_fIF_2$ is more efficient than $R_fIF_4$; $R_fIF_2$ is, therefore, the preferred initator type. The nature of $R_f$ in $R_fIF_x$ apparently has only a minor effect on the efficiency as an initator, as long as $R_f$ is not $CF_3$.

Although they are not required, inert solvents may be also used in the present telomerization process. Useful inert solvents include those mentioned earlier in connection with preparation of $R_fIF_x$ i.e., the perfluoroalkanes such as perfluorohexane and the chlorofluorocarbons such as trifluorochloromethane or chloropentafluoroethane.

As indicated above, the nature of the perfluoroalkyl iodide $R'_fI$ and the olefin $(R^1)_2C=CR^1R^2$ both have effects on the telomerization process. The nature of $R'_fI$ affects the reaction rate but apparently has little effect on the nature of the product, particularly the value of $n$ in $R'_f[C(R^1)_2-CR^1R^2]_nI$. It has been found that $CF_3I$ telomerizes only very slowly, $C_2F_5I$ telomerizes more rapidly than $CF_3I$ but much more slowly than n-$C_3F_7I$ $(CF_3)_2CFI$ or higher homologs of these iodides. As yet no completely satisfactory explanation for these observations exists.

The nature of the olefin $(R^1)_2C=CR^1R^2$ effects not only the rate of the telomerization reaction but also the nature of the product $R'_f[C(R^1)_2CR^1R^2]_nI$. Tetrafluoroethylene telomerizes readily to give the products $R'_f[CF_2CF_2]_nI$ wherein $n$ is predominantly three to seven. Ethylene, vinyl fluoride, vinylidene fluoride and hexafluoropropylene, on the other hand, give predominantly the products where $n$ is one, usually accompanied by only small amounts of products with $n$ of two or greater. A possible intermediate in this process has the structure $R'_f[C(R^1)_2CR^1R^2]_nIF_x$ which can either react with further olefin or undergo "chain transfer," i.e., $R'_fC(C^1),CR^1R^2IF_x + (R^1)_2C=CR^1R^2 \rightarrow$
$R'_f[C(R^1)_2CR^1R^2]_2IF_x$
$R'_fC(R^1)_2CR^1R^2IF_x + R'_fI \rightarrow R'_fI(R^1)_2CR^1R^2I + R'_fIF_x$ When the group —$CR^1R^2IF_x$ of the intermediate is considerably less stable than $R'_fIF_x$, chain transfer will predominate. If the two are of comparable stability, chain transfer becomes less important. Even with tetrafluoroethylene, containing the group —$CF_2IF_x$, chain transfer is still important. With ethylene, containing the group —$CH_2IF_x$, chain transfer almost excludes further reaction.

Other factors apparently also enter the picture. For example, hexafluoropropylene forms almost exclusively

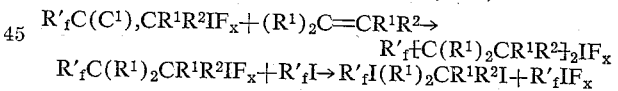

although the intermediate should be as stable as $R'_fIF_x$. Steric factors are probably responsible. With tetrafluoroethylene, the products are primarily limited to those of structure $R'_f(CF_2CF_2)_nI$ where $n$ is two to three (i.e., chain transfer relatively rapid) by higher initiator concentrations, higher temperatures, the absence of solvent and the use of $R'_fI$ telogen containing four or more carbons. Products of a broader range, say $n=2–7$, are favored by lower initiator concentrations, higher olefin concentration, lower temperatures, telogens of less than four carbons, particularly $C_2F_5I$, and inert solvents.

The use of a closed reaction system is preferred, especially where superatmospheric pressures are required. Depending on the pressures involved, glass, steel, stainless steel, nickel, "Inconel," "Monel" and like alloys are useful materials for fabricating the pressure vessel or autoclave. The perfluoroalkyl iodide telogen, solvent if used and initiator are placed in the reaction vessel and brought to the desired reaction temperature. The olefin is then admitted to the system, at partial pressures of from 20–150 p.s.i.g., 60–120 p.s.i.g. preferably and usually in sufficiently small increments to allow removal of the heat of reaction readily. Olefin is added until the desired amount is present or reaction ceases. Agitation during the olefin addition, if not a necessity, is certainly desirable. When complete, the reaction mass is cooled and the mixture of reactants, solvent and products is separated. Any convenient means may be used, e.g., vacuum stripping, fractional distillation, etc. Mixtures of telomer products may be separated or used as is. This process is not limited to any particular method of recovering the products.

The products of the present telomerization process are, in general, well known in the art, having the structure $R'_f\text{[C}(R^1)_2CR^1R^2\text{]}_nI$ as previously defined. Such compounds have a wide variety of uses, as disclosed in the following: U.S. Patents 3,132,185; 3,172,910; 3,051,764; 3,145,222; 3,106,589; 3,116,337; 3,083,238; 3,016,406; French Patents 1,343,601 and 1,356,923; Belgian Patent 641,569, Canadian Patent 674,572 and Japanese Publication 18,112/64. When $R^1$ and $R^2$ are all F, the products are perfluoroalkyl iodides of higher molecular weight which are useful intermediates for preparing oil and water repellents for textiles and for preparing perfluorocarboxylic acids. When either or both $R^1$ and $R^2$ are H, these products are readily converted to olefins which are useful polymer intermediates. The iodide products may also be converted to amines, alcohols, esters and the like having known utilities.

U.S. Patent 3,234,294 discloses the telomerization of perfluoroalkyl iodides with tetrafluoroethylene in the presence of iodine pentafluoride and an antimony halide, particularly antimony pentafluoride. While it may appear at first glance that this patent process must involve in situ formation of $R_fIF_x$ which initiates telomerization as in the present process, such is not the case. In the first place, iodine pentafluoride does not react with perfluoroalkyl iodides to form $R_fIF_x$, either alone or in the presence of antimony pentafluoride. Secondly, the patentee has shown that both iodine pentafluoride and antimony pentafluoride are necessary in his process; omission of either prevents reaction. If $R_fIF_x$ were involved in the patent process, it should be possible to convert $R_fI$ to $R_fIF_x$ with iodine pentafluoride, either alone or in the presence of antimony pentafluoride. Since this cannot be done, it must be concluded that the process of this patent is different in kind and does not involve the telomerization initiators of the present invention.

Representative examples further illustrating the invention follow.

EXAMPLE 1

Liquid chlorine trifluoride (4.67 g., 0.05 mole) was added to a solution of n-perfluorohexyl iodide (33.4 g., 0.075 mole) in 100 ml. perfluorohexane with agitation under anhydrous conditions at about −70° C. Reaction occurs quickly. The reaction mixture was allowed to warm slowly to 0°, then the solvent and any excess n-perfluorohexyl iodide were evaporated under vacuum at less than 0° C., giving a solid of formula $C_6F_{13}IF_2$, insoluble in $C_6F_{13}I$ and $C_2F_3Cl_3$; a high melting solid which gradually decomposes on heating.

*Analysis.*—Calcd. for $C_6F_{13}IF_2$: C, 14.9; F (total), 58.8; F (hydrolyzable), 7.85; I, 26.2. Found: C, 15.55; F (total) 58.45; F (hydrolyzable), 7.9; I, 25.75.

EXAMPLE 2

Perfluoroethyl iodide was condensed into a reaction vessel under anhydrous conditions. Dry helium gas was passed through liquid chlorine trifluoride while the latter was maintained at about 0° C. and the mixture of vapors was passed into the liquid perfluoroethyl iodide maintained below −70° C. until 0.2 mole $ClF_3$/mole $C_2F_5I$ had been added. Then, while holding the reaction mass at less than 0° C., the excess perfluoroethyl iodide was evaporated under vacuum giving solid $C_2F_5IF_2$, melting point 18° C. The nuclear magnetic resonance spectrum was consistent with this structure.

*Analysis.*—Calcd. for $C_2F_5IF_2$: C, 8.45; F (total), 46.8; F (hydrolyzable), 13.4; I, 44.7. Found: C, 8.6; F (total), 46.65; F (hydrolyzable), 13.5; I, 42.9.

After storage at room temperature in a desiccator for five weeks, a pure sample of $C_2F_5IF_2$ had undergone some decomposition to $C_2F_5I$, $C_2F_6$, and $IF_5$, but the sample was still predominantly $C_2F_5IF_2$.

EXAMPLE 3

Example 1 was repeated substituting perfluoroethyl iodide for n-perfluorohexyl iodide. The reaction was quite vigorous. $C_2F_5IF_2$ was obtained in almost quantitative yield. The product was almost identical (nuclear magnetic resonance) to that of Example 2, but contained a trace of $C_2F_5IF_4$.

EXAMPLE 4

A. Using the procedure of Example 2, 0.1 mole of chlorine trifluoride in a helium stream was added to 0.5 mole of 2 - iodoperfluoropropane $(CF_3)_2CFI$ with agitation at −70° C. under anhydrous conditions. The excess $(CF_3)_2CFI$ was removed under vacuum as before, giving a 99% yield of $(CF_3)_2CFIF_2$ (structure confirmed by nuclear magnetic resonance) as a pasty solid.

B. Using the procedure of Example 2, 0.1 mole of chlorine trifluoride in a helium stream was added to 0.5 mole of n-perfluorohexyl iodide at −70° C. The product n-$C_6F_{13}IF_2$ was isolated as above described, M.P. 35° C.

EXAMPLE 5

A. Example 1 was repeated substituting n-perfluorobutyl iodide for n-perfluorohexyl iodide (mole ratio $C_4F_9I/ClF_3=6/1$). After isolating the product in the same manner, solid n-$C_4F_9IF_2$ was obtained, M.P., about 150° C.

*Analysis.*—Calcd. for $C_4F_9IF_2$: C, 12.5; F (total), 54.4; F (hydrolyzable), 9.9; I, 33.1. Found: C. 12.4; F (total), 55.3; F (hydrol.), 9.0; I, 33.3.

B. Example 2 was repeated substituting n-perfluorobutyl iodide for perfluoroethyl iodide. $C_4F_9IF_2$ was obtained, identical by nuclear magnetic resonance to that obtained above.

EXAMPLE 6

A solution of 0.0337 mole of n-$C_{10}F_{21}I$ in 70 ml. of perfluorohexane was chilled to −70° C., precipitating the iodide as a finely divided solid. To this mixture was added 0.03 mole of liquid chlorine trifluoride under anhydrous conditions with agitation. After 15 minutes at −70° C., the mixture was warmed to 25° C. and stirred one hour. The product was insoluble. A portion of the solvent was removed at 100 mm. pressure, the residue was cooled to −70° C. and washed with perfluorohexane, giving relatively pure solid of empirical formula $C_{10}F_{21}IF_2$ (31.2 g.), M.P. about 200° C. decomposition.

*Analysis.*—Calcd. for $C_{10}F_{21}IF_2$: C, 17.5; F (total), 63.8; F (hydrolyzable), 5.5; I, 18.6. Found: C, 17.45; F (total), 61.4; F (hydrolyzable), 5.0; I, 19.2.

EXAMPLE 7

Nine grams of a mixture consisting of 6.0% n-$C_{14}F_{29}I$, 43.6% n-$C_{16}F_{33}I$, 38.2% n-$C_{18}F_{37}I$, 3.9% n-$C_{20}F_{41}I$, 0.2% n-$C_{22}F_{45}I$ and the remainder perfluoroalkanes was dissolved in 80 ml. of perfluorohexane at 44° C. The mixture was chilled to −70° C. and one gram of chlorine trifluoride liquid was added all at once under anhydrous conditions with agitation. The mixture was then allowed to warm to room temperature and the solvent was evaporated under vacuum, giving a mixture of solids of formula n-$C_nF_{2n+1}IF_2$ wherein $n$ is 14, 16, 18 20 and 22 in approximately the same ratio as the starting material.

EXAMPLE 8

A. A mixture of 206 g. (0.6 mole) of n-perfluorobutyl iodide and 2614 g. of perfluorohexane was cooled to −80° C. under anhydrous conditions. Then 40.7 g. (0.45 mole) of liquid chlorine trifluoride was added over a period of five minutes with agitation, giving a solid precipitate. The reaction was allowed to warm slowly to −30° C., causing the solid to dissolve. The mass was recooled to −55° C. and an additional 69.3 g. (0.75 mole) of liquid chlorine trifluoride was added as before (total $ClF_3$, 1.2 mole). The volatile material was then removed under vacuum (150 mm.) at 0° C. giving 216 g. of residue, shown by nuclear magnetic resonance to be 85% n-$C_4F_9IF_4$ and 15% $C_6F_{14}$. A pure sample of $$n\text{-}C_4F_9IF_4$$

(melting point about 10° C.) had the following:

*Analysis.*—Calcd.: C, 11.4; F (total), 58.6; F (hydrolyzable), 18.0; I, 30.1. Found: C, 11.6; F (total), 58.7; F (hydrolyzable), 16.7; I, 30.2.

B. When the above procedure was repeated substituting an excess of bromine pentafluoride for chlorine trifluoride, n-$C_4F_9IF_4$ was again obtained. $C_4F_9IF_4$ appears to be quite stable at −20° C., but tends to decompose slowly on storage near room temperature.

EXAMPLE 9

A mixture of 0.034 mole of n-$C_{10}F_{21}I$ in 70 ml. of perfluorohexane was cooled to −70° C. Then 0.07 mole of liquid chlorine trifluoride was added, with some heat evolution. After 15 minutes at −63° C. and one hour at room temperature, a portion of the solvent was removed at 38° C. under vacuum and replaced by pure perfluorohexane. The solution was cooled to 5° C., the precipitated solid collected by filtration and the filter cake washed with perfluorohexane, giving a solid of formula $C_{10}F_{21}IF_4$ (25.4 g.).

*Analysis.*—Calcd.: C, 16.6; F (total), 65.8; I, 17.6. Found: C, 17.1; F, 60.3; I, 19.7.

EXAMPLE 10

Liquid chlorine trifluoride (0.113 mole) was added to a mixture of 0.057 mole of perfluoroethyl iodide in 50 ml. perfluorohexane at −70° C. The reaction mass containing an insoluble lower layer was then allowed to warm, remaining a two-phase liquid until it reached −15° C. At this point, a vigorous reaction ensued, causing the temperature to rise to 30° C. and a solid to precipitate (chlorine monofluoride is also given off). The solid melted (M.P. ca. 0° C.). The solvent was removed under vacuum, leaving a residue (15.9 g.), M.P. ca. 13° C. consisting of 70% $C_2F_5IF_4$ and 30% $C_6F_{14}$ (nuclear magnetic resonance).

*Analysis.*—Calcd. for: 70% $C_2F_5IF_4$+30% $C_6F_{14}$: C, 11.6; I, 27.6. Found: C, 11.2; I, 27.5. Reproducible fluorine analyses could not be obtained.

EXAMPLE 11

Perfluoromethyl iodide (25 g., 0.13 mole) was dissolved in 30 ml. of perfluorohexane at −80° C. Then, using the procedure of Example 2, a stream of gaseous chlorine trifluoride (0.05 mole) and helium was passed into the solution over a one hour period. A yellow solid formed. The solvent and excess perfluoromethyl iodide were evaporated at −30° C. under vacuum. The residual yellow solid was allowed to warm. It began to decompose at about 0° C., the observed decomposition products being $CF_4$, $IF_5$, $CF_3I$, $I_2$ and $IOF_3$ (probably from reaction of $IF_5$ with glass apparatus).

Schmeisser, Angew. Chem., 71, 524 (1959) reported obtaining $CF_3IF_2$ as a white solid by reaction of $CF_3I$ with fluorine in monofluorotrichloromethane at −80° C. In the present example monofluorotrichloromethane could not be used because it reacts with chlorine trifluoride. Schmeisser reported his product to decompose at 0° C. or higher to $CF_3I$, $CF_4$, $IF_5$, and $I_2$, essentially as observed above. There is then no doubt that the above example produced the same product as obtained by Schmeisser, the yellow color of the present product probably being due to trace impurities.

Given below is a tabular comparison of Schmeisser's product with the products of this invention, based primarily on the properties of $C_2F_5IF_2$ as reported herein.

| Property | Compound | | |
|---|---|---|---|
| | $C_3IF_2$[a] | $C_2F_5IF_2$ | |
| | | Low Melting | High Melting [b] |
| Melting Point | 51° C.[c] | 18° C. | ca. 200° C. |
| Solubility (nonpolar solvents) | Insoluble | Soluble | Insoluble. |
| Stability (Room Temperature) | Unstable | Stable | Stable. |

[a] As cited by Schmeisser.
[b] Based on $C_4F_9IF_2$ of high melting form.
[c] May be rapid decomposition and not true melting.

There is thus a fundamental difference between Schmeisser's product and $C_2F_5IF_2$. It behaves more like the low melting form of $C_2F_5IF_2$ in melting point, if Schmeisser truly observed a melting point, more like the high melting $R_fIF_2$ compounds in solubility and unlike either in stability. When usefulness as a catalyst is added (see Example 23), there remains no doubt that Schmeisser's product is different in kind from the $R_fIF_2$ compounds of this invention.

EXAMPLE 12

A. A mixture of 42.6 g. (0.180 mole) of perfluoroethyl iodide and 7.1 g. (0.04 mole) of bromine pentafluoride was stirred at −50° C. without apparent effect. When allowed to warm, a vigorous reaction occurred. After removal of reactants under vacuum as before, the liquid residue was shown to contain equimolar quantities of $C_2F_5IF_2$ and $C_2F_5IF_4$ by nuclear magnetic resonance.

B. A mixture of 51.9 g. (0.15 mole) of n-perfluorobutyl iodide and 10.5 g. (0.06 mole) bromine pentafluoride was prepared at −80° C., then warmed very slowly (about ½ hour) to room temperature (a violent reaction can occur at about −30° C. unless great care is exercised in warming the mixture). Evaporation of unreacted iodide and by-product bromine under vacuum gave a viscous liquid (melting point approximately 18° C.) which contained equimolar amounts of n-$C_4F_9IF_2$ and n-$C_4F_9IF_4$.

C. Similarly, when 0.1 mole of n-$C_4F_9I$ in 146 g. of perfluorohexane at −80° C. is treated with 7.0 g. (0.04 mole) of bromine pentafluoride and the mixture is allowed to warm to room temperature, the resulting product (22.6 g.) after removal of unreacted materials and by-product bromine, contains 64% n-$C_4F_9IF_4$ and 36% n-$C_4F_9IF_2$, melting point about 16° C.

EXAMPLE 13

A solution of 17.3 g. (0.05 mole) of n-perfluorobutyl iodide in 73.2 g. perfluorohexane was prepared and cooled to −70° C. Bromine trifluoride (6.9 g.), was added with agitation. The $BrF_3$ froze. The mixture was warmed cautiously. At −20° C., an exothermic reaction ensued which required cooling. When reaction was complete, solvent and excess iodide were removed at room temperature under vacuum. The residual solids (19.8 g.) were shown to be an equimolar mixture of n-$C_4F_9IF_2$ and n-$C_4F_9IF_4$ by nuclear magnetic resonance.

Telomerization

*General procedure.*—A glass pressure bottle fitted with a thermowell, a liquid cooling line, a magnetic stirring device and a valved sample line was connected to a "Monel" vacuum line of standard design. A source for olefin was attached to the line as well as gas measuring and pressure relief devices. When the olefin contained an inhibitor, e.g., tetrafluoroethylene, a scrubbing system was also provided. The olefin feed was controlled by a pressure-actuated solenoid-operated valve. The cooling water was also admitted through a solenoid valve, controlled by a thermocouple in the thermowell. A heating bath for the pressure bottle was also provided.

Before use, the system was dried at 200° C. for 24 hours. The telogen and initiator were added to the pressure bottle in the desired amounts and the bottle attached to the vacuum line. The contents were cooled to −80° C. and evacuated for one minute to remove air, then heated to the desired reaction temperature.

When the telogen perfluoroalkyl iodide was gaseous under normal conditions, e.g., perfluoromethyl or perfluoroethyl iodides, the material was condensed into the evacuated system by cooling the pressure bottle.

The olefin was then admitted to the system. Any heat of reaction was removed by the cooling coil. The system pressure was kept essentially constant by controlled addition of the olefin. When addition of the olefin was complete, the mixture was stirred at the reaction temperature until no further reaction appeared to occur, usually indicated by no further decrease in pressure. The mixture was then cooled to 60° C. below the normal boiling point of the telogen. Unreacted olefin was removed under vacuum, collected and measured. The remaining mixture as then characterized. The product was usually analyzed by vapor phase chromatography, the retention times of the products being known from other sources.

Unless indicated otherwise, the amount of olefin added was stopped arbitrarily at the indicated amount. In most cases, the ability of the reaction mixture to absorb further olefin had not disappeared.

EXAMPLE 14

A mixture of 5.9 g. (0.012 mole) of $C_6F_{13}IF_2$ (prepared in Example 1) and 100 g. (0.34 mole) of n-$C_3F_7I$ was placed in the glass pressure bottle described above. After evacuating to remove air and then heating to 70° C., 33.4 g. tetrafluoroethylene were admitted at 70–78° C. and 120 p.s.i.g. pressure over a period of ten minutes. Heating was continued at about 70° C.; after 32 minutes, the pressure had fallen to 38 p.s.i.g. Analysis of the resulting product by vapor phase chromatography gave the following results:

| $F(CF_2)_nI$, $n=$ | Relative area, percent |
|---|---|
| 3 | 41.2 |
| 5 | 20.9 |
| 6 | 1.9 |
| 7 | 15.6 |
| 8 | 0.83 |
| 9 | 13.5 |
| 10 | 0.43 |
| 11 | 6.0 |
| 12 | 0.22 |
| 13 | 2.3 |
| 14 | 0.11 |
| 15 | 0.82 |
| 17 | 0.17 |
| 19 | 0.05 |

EXAMPLE 15

Using the procedure above, a mixture of 0.95 g. (0.00335 mole) of $C_2F_5IF_2$ (from Example 2), 86.3 g. (0.25 mole) of n-$C_4F_9I$ and 47 ml. n-$C_6F_{14}$ was caused to react with 25 g. (0.25 mole) of tetrafluoroethylene at 60° C. and 80 p.s.i.g. After 3¼ hours, the product (187.8 g.) was found to consist of $C_4F_9(CF_2CF_2)_nI$ products wherein $n$ is from 0 to 8.

EXAMPLE 16

A mixture of 5.7 g. (0.017 mole) of crude $C_2F_5IF_2$ (consisting of 86 mole percent $C_2F_5IF_2$, 6 mole percent $C_2F_5IF_4$ and 8 mole percent $C_2F_5I$), 153 g. (0.622 mole) of $C_2F_5I$ and 20.2 g. (0.0584 mole) of $C_4F_9I$ caused to react with 35.6 g. (0.356 mole) of tetrafluoroethylene at 60° C. and 90 p.s.i.g. Reaction was quite rapid. Vapor phase chromatographic analysis of the product (197.1 g.) indicated the following:

| $F(CF_2)_nI$, $n=$ | Area, percent |
|---|---|
| 2 | 63.8 |
| 4 | 13.3 |
| 6 | 8.2 |
| 8 | 5.9 |
| 10 | 3.7 |
| 12 | 2.2 |
| 14 | 1.2 |
| 16 | 0.55 |
| 18 | 0.24 |
| 20 | 0.09 |
| 22 | 0.03 |

Traces of products wherein $n$ had odd values were also seen.

EXAMPLE 17

The $(CF_3)_2CFIF_2$ product of Example 4 was dissolved in $(CF_3)_2CFI$ (296 g., 1.0 mole) and the solution heated to 70° C. Then tetrafluoroethylene was added, keeping the pressure on 120 p.s.i.g. until 29 g. (0.29 mole) were consumed. Analysis of the product by vapor phase chromatography indicated high yields of the products of structure $(CF_3)_2CF—(CF_2CF_2)_nI$ wherein $n$ is one to six. Products of this structure were described in U.S.P. 3,234,294.

EXAMPLE 18

A mixture of crude $C_4F_9IF_2$ (7.7 g.) prepared according to Example 5B and containing 54 mole percent $C_4F_9IF_2$, 3% $C_4F_9IF_4$ and 43 mole percent $C_4F_9I$, and 152 g. (0.618 mole) of $C_2F_5I$ and 20.2 g. $C_4F_9I$ was caused to react with 41.8 g. (0.418 mole) of tetrafluoroethylene, two hours at 60° C. Analysis of the product by vapor-phase chromatography indicated the following:

| $F(CF_2)_nI$, $n=$ | Area, percent |
|---|---|
| 2 | 72.6 |
| 4 | 8.7 |
| 6 | 6.0 |
| 8 | 4.5 |
| 10 | 3.1 |
| 12 | 2.0 |
| 14 | 0.85 |
| 16 | 0.27 |
| 18 | 0.06 |
| 20 | 0.02 |

In the same manner, $C_4F_9IF_2$ has been used to cause reaction of n-$C_4F_9I$, n-$C_6F_{13}I$ and n-$C_3F_7I$ with tetrafluoroethylene to form telomers.

EXAMPLE 19

Using the above procedure, a mixture of 0.00717 mole of n-$C_{10}F_{21}IF_2$ (prepared in Example 6) and 100 g. (0.338 mole) of n-$C_3F_7I$ was caused to react with 35 g. (0.35 mole) of tetrafluoroethylene for two hours at 70° C. and 120 p.s.i.g. The product (136.4 g.) consisted primarily of $F(CF_2)_nI$ where $n$ is 3, 5, 7, 9, 11, with smaller amounts with $n$ having values of 13, 15, 17 and 19. Traces of compounds with even values of $n$ from 10 to 20 were also seen.

EXAMPLE 20

A mixture of 0.0053 mole of n-$C_{10}F_{21}IF_2$ (Example 6), 0.25 mole of n-$C_4F_9I$ was heated to 90° C. and tetrafluoroethylene was added at 135 p.s.i.g. maximum. The temperature increased rapidly to 130° C., where it was held by use of water cooling until 0.15 mole had been consumed. Analysis of the product indicated the following:

| $F(CF_2)_nI$, $n=$ | Area, percent |
|---|---|
| 4 | 55.8 |
| 6 | 23.9 |
| 8 | 9.1 |
| 10 | 7.2 |
| 12 | 2.6 |
| 14 | 0.88 |
| 16 | 0.23 |
| 18 | 0.07 |

EXAMPLE 21

A mixture of 0.25 mole n-$C_4F_9I$ and 0.000175 mole n-$C_{10}F_{21}IF_2$ (0.07 mole percent) was heated to 70° C. and caused to react with tetrafluoroethylene at 100 p.s.i.g. until 0.075 mole of tetrafluoroethylene was consumed. Analysis indicated the products to be of structure $$n\text{-}C_4F_9(CF_2CF_2)_nI$$

with $n$ from zero to seven.

This experiment was repeated using 0.00076 mole of n-$C_4F_9IF_2$ (ten days old) and 0.25 mole of n-$C_4F_9I$ at 60° and 100 p.s.i.g. pressure. A total of 0.167 mole of tetrafluoroethylene was consumed in three hours. The products had the structure $C_4F_9(CF_2CF_2)_nI$ where $n$ is from zero to nine.

EXAMPLE 22

About 0.005 mole of the mixture of $R_fIF_2$ prepared in Example 7 and 0.25 mole of n-$C_4F_9I$ was heated to 70° C. and caused to react with tetrafluoroethylene at 100 p.s.i.g. After 2.5 hours, 0.14 mole of tetrafluoroethylene was consumed. The major products had the structure $$C_4F_9(CF_2CF_2)_nI, \ n=1\text{-}7$$

EXAMPLE 23

About 0.05 mole of $CF_3IF_2$ (prepared in Example 12 at −80° C.) was mixed with 150 g. (0.433 mole) of n-$C_4F_9I$. The mixture was warmed rapidly. At no time did the solid dissolve. At about 0° C., decomposition set in as indicated by change in appearance and a marked increase in pressure. Tetrafluoroethylene was added and the mixture kept at 65° C. and 95–127 p.s.i.g. There was no pressure drop. The tetrafluoroethylene recovered contained carbon tetrafluoride. Some $C_2F_5I$ was also found. Less than 0.05 mole of tetrafluoroethylene was consumed. Only traces of any telomer products were detected and these apparently were derived from $C_2F_5I$.

EXAMPLE 24

A mixture of 0.0070 mole of $C_2F_5IF_4$ (Example 10) and 0.25 mole of $C_2F_5I$ was caused to react with tetrafluoroethylene at 70° C. and 150 p.s.i.g. In 1.5 hours, 0.075 mole of tetrafluoroethylene was consumed. The products were shown to consist of $C_2F_5(CF_2CF_2)_nI$ with $n$ from zero to seven.

EXAMPLE 25

A mixture of 0.0237 mole of $C_4F_9IF_4$ (Example 8) and 0.25 mole n-$C_4F_9I$ was caused to react with tetrafluoroethylene (0.2214 mole consumed) at 70° C. and 90 p.s.i.g. Analysis indicated the following product composition:

| $F(CF_2)_nI$, $n=$ | Area, percent |
|---|---|
| 2 | 0.47 |
| 4 | 42.7 |
| 6 | 23.8 |
| 8 | 15.4 |
| 10 | 8.4 |
| 12 | 3.9 |
| 14 | 1.7 |
| 16 | 0.70 |
| 18 | 0.26 |
| 20 | 0.06 |
| 22 | 0.02 |

EXAMPLE 26

A suspension of 6.0 g. of n-$C_4F_9IF_2$ and 0.25 mole of n-$C_4F_9I$ was caused to react with tetrafluoroethylene using the hereinbefore described procedure at 70° C. and 92 p.s.i.g. In 0.5 hour, 0.20 mole of tetrafluoroethylene was consumed. Analysis of the product indicated the following:

| $F(CF_2)_nI$, $n=$ | Area, percent |
|---|---|
| 4 | 45.9 |
| 6 | 28.7 |
| 8 | 14.3 |
| 10 | 5.8 |
| 12 | 2.0 |
| 14 | 0.62 |
| 16 | 0.093 |

EXAMPLE 27

A mixture of n-$C_3F_7IF_2$ and $C_3F_7IF_4$ was prepared from 2.6 g. (0.015 mole) bromine pentafluoride and 82.9 g. (0.28 mole) of n-$C_3F_7I$ using the procedure of Example 12. The crude product, containing the excess n-$F_3F_7I$ and the bromine which formed, was caused to react with tetrafluoroethylene at 55–60° C. and 60–80 p.s.i.g. using the above described procedure. A total of 28.8 g. (0.288 mole) of tetrafluoroethylene was consumed. Product analysis indicated the following:

| $F(CF_2)_nI$, $n=$ | Area, percent |
|---|---|
| 3 | 32.6 |
| 5 | 20.4 |
| 7 | 17.7 |
| 9 | 12.4 |
| 11 | 7.1 |
| 13 | 3.6 |
| 15 | 1.6 |
| 17 | 0.42 |

Trace amounts of $BrCF_2CF_2Br$ were also present.

EXAMPLE 28

A mixture of n-$C_3F_7IF_2$ and n-$C_3F_7IF_4$ was prepared by treating a solution of 0.050 mole n-$C_3F_7I$ in 75 g. of $C_6F_{14}$ with 0.357 mole of chlorine trifluoride at −70° C., using the procedure of Example 1. The solvent and any unreacted n-$C_3F_7I$ were removed under vacuum. The residue (15.0 g., 0.04 mole) was dissolved in 100 g. (0.338 mole) of n-$C_3F_7I$ and caused to react with tetrafluoroethylene at 60° C. and 70–100 p.s.i.g. using the previously described procedure. The major product was very similar to that of Example 27. In addition, some $C_2F_5I$ was found, apparently due to some unknown reaction with tetrafluoroethylene, perhaps the addition of the elements of IF formed in a side reaction.

EXAMPLE 29

The product of Example 12C (16 g.) was dissolved in 100 g. (0.41 mole) of $C_2F_5I$ and caused to react with tetrafluoroethylene at 55–65° and 100 p.s.i.g. using the above described procedure, consuming 11.4 g. (0.114 mole) of tetrafluoroethylene. Analysis of the product indicated the following:

| $F(CF_2)_nI$, $n=$ | Area, percent |
|---|---|
| 2 | 25.3 |
| 4 | 31.9 |
| 6 | 17.5 |
| 8 | 11.0 |
| 10 | 8.5 |
| 12 | 2.5 |
| 14 | 1.0 |
| 16 | 0.44 |

The remaining 4.8% was a mixture of $F(CF_2)_nI$ wherein $n$ has odd number values and of $F(CF_2)_nF$ wherein $n$ has even number values.

EXAMPLE 30

A solution of 15.4 g. of the mixture of n-$C_4F_9IF_2$ and n-$C_4F_9IF_4$, obtained in Example 13, in 100 g. of $C_2F_5I$ was caused to react with tetrafluoroethylene at 50° C. and 90 p.s.i.g. using the above procedure. A total of 32.0 g. (0.32 mole) of tetrafluoroethylene were consumed in three hours. The product was the series of compounds $F(CF_2)_nI$ wherein $n$ has even number values of two to 20, very similar to that of Example 16.

EXAMPLE 31

A mixture containing 0.0422 mole of n-$C_4F_9IF_2$, 0.0253 mole n-$C_4F_9I$ and 0.306 mole of $CF_3I$ was caused to react with tetrafluoroethylene at 60° C. and 175 p.s.i.g. using the earlier described procedure. Only 9 g. (0.09 mole) of tetrafluoroethylene would react. Analysis of the product indicated the products were $F(CF_2)_nI$ wherein $n$ had both even and odd number values (the former from $C_4F_9I$, the latter from $CF_3I$). Those having even values predominated. Since the mole ratio of $CF_3I/C_4F_9I$ was 12, $C_4F_9I$ is more than 12 times as reactive as $CF_3I$. Hence $CF_3I$ is a very poor telogen.

EXAMPLE 32

A series of telomerizations were carried out in perfluorohexane solution. Table I indicates the conditions. In each case, the reaction was arbitrarily stopped when the indicated amount of tetrafluoroethylene was added.

In a similar series of experiments, the same reactions were repeated omitting the perfluorohexane. In every case, the time required to consume the same amount of tetrafluoroethylene was increased by at least a factor of four and often larger.

The products from both series were of structure $F(CF_2)_nI$ wherein $n$ has even number values. Comparison of results with and without solvent shows that the presence of solvent favors or enhances the relative amounts of products having higher values of $n$. Thus, if lower values of $n$ are desired, solvent should not be used; if higher values of $n$ are desired the solvent should be used.

TABLE I

| | Telogen | Mole | Catalyst | Mole | $C_6F_{14}$, g. | Temp., °C. | Pressure, p.s.i.g. | $C_2F_4$, Mole | Time Min. |
|---|---|---|---|---|---|---|---|---|---|
| A | $C_4F_9I$ | 0.144 | $C_4F_9IF_2$ | 0.0122 | 95 | 66–75 | 75–100 | 0.334 | 13 |
| B | $C_4F_9I$ | 0.231 | $C_4F_9IF_2$ | 0.0122 | 237 | 62 | 100 | 0.364 | 15 |
| C | {$C_2F_5I$ / $C_4F_9I$} | 0.631 / 0.0518 | $C_4F_9IF_2$ | 0.0122 | 265 | 65 | 100 | 0.35 | 13 |
| D | {$C_2F_5I$ / $C_4F_9I$} | 0.80 / 0.026 | $C_4F_9IF_2$ | 0.00094 | 110 | 60 | 100 | 0.40 | 27 |

EXAMPLE 33

A mixture of 6.4 g. (0.0156 mole) of n-$C_4F_9IF_2$ and 86.2 (0.25 mole) of n-$C_4F_9I$ was caused to react with ethylene at 60° C. and 100 p.s.i.g. using the earlier described procedure for one hour. The temperature was then increased to 80° C. and held for ½ hour. Distillation of the product gave about 0.02 mole of $$n\text{-}C_4F_9CH_2CH_2I$$

and trace amounts of n-$C_4F_9(CH_2CH_2)_nI$ where $n$ is 2, 3 and 4.

EXAMPLE 34

Example 33 was repeated, substituting vinyl fluoride for ethylene and using 60–81° C. and 100 to 132 p.s.i.g. The major product was n-$C_4F_9CH_2CHFI$ with traces of n-$C_4F_9$—$(CH_2CHF)_nI$, $n=2$, 3 and 4.

EXAMPLE 35

Example 33 was repeated, substituting vinylidene fluoride for ethylene and using one hour at 60° C. and 100 p.s.i.g., followed by heating at 78° C. and 125 p.s.i.g. Fractional distillation of the product gave 25 g. of pure n-$C_4F_9CH_2CF_2I$, B.P. 128°/1 atm. and smaller amounts of n-$C_4F_9(CH_2CF_2)_2I$.

Analysis of $C_4F_9CH_2CF_2I$. Calcd. for $C_6F_{11}H_2I$: C, 17.6; F, 51.0; H, 0.49; I, 31.0. Found: C, 17.2; F, 51.0; H, 0.55; I, 30.6.

Telomerization of perfluoroalkyl iodides with vinylidene fluoride under free radical conditions is known in the art. For example: A mixture of 0.25 mole of n-$C_4F_9I$ and 0.01 mole of azobis(isobutyronitrile) was heated at 55° C. under 100 p.s.i.g. vinylidene fluoride pressure for 10 minutes at 65° C. for 30 minutes then at 75° C. for 45 minutes. A further 0.05 mole of the nitrile was added and heating was continued for five hours at 70–75° C. and 100 p.s.i.g. Very little vinylidene fluoride was consumed. The crude product contained about 2% $C_4F_9CH_2CF_2I$ and about 0.5% $C_4F_9(CH_2CF_2)_2I$. Thus, the use of n-$C_4F_9IF_2$ gives higher conversions in much shorter times.

EXAMPLE 36

Example 33 was repeated, substituting hexafluoropropylene for ethylene using 60° C. and 60 p.s.i.g. pressure for one hour, followed by two hours at 80° C. About 0.5 mole of n-$C_4F_9CF_2CFICF_3$, B.P. 56° C./50 mm., per mole of n-$C_4F_9IF_2$ was obtained. A trace of

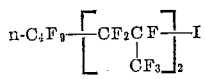

was also detected.

EXAMPLE 37

Example 33 was repeated, substituting trifluoroethylene for ethylene. Telomers of formula $C_4F_9(C_2F_3H)_nI$ were detected by gas chromatography with $n$ from one to seven. The mixture was separated into individual fractions by distillation and the separate fractions were characterized by nuclear magnetic resonance, gas chromatography, and mass spectroscopy.

Addition of $C_4F_9I$ to $C_2F_3H$ may occur in two manners, mode A where iodine becomes attached to the —$CF_2$— group giving $C_4F_9CFHCF_2I$, and mode B where iodine becomes attached to the —CFH— group giving $C_4F_9CF_2CFHI$. These products occur in a ratio of about 4 to 1.

Both of the above products may again react with $C_2F_3H$, theoretically forming the four products $$C_4F_9(CF_2CHF)_2I$$

$C_4F_9CF_2CHFCHFCF_2I$, $C_4F_9CHFCF_2CF_2CHFI$, and $C_4F_9(CHFCF_2)_2I$. The last three were identified positively by mass spectroscopy but the first, if present, was not identified. Again, mode A was preferred to mode B by 4 to 1.

Likewise, the three products $C_4F_9(C_2F_3H)_2I$ above may react with $C_2F_3H$ by either mode A or mode B, giving eight theoretically possible products $C_4F_9(C_2F_3H)_3I$ from the four theoretically possible products $C_4F_9(C_2F_3H)_2I$. The mixture of empirical formula $C_4F_9(C_2F_3H)_3I$ was not completely resolved but the product $$C_4F_9(CFHCF_2)_3I$$

was identified positively while the products $$C_4F_9(CFHCF_2)_2CF_2CHFI$$

and $C_4F_9CF_2CFH(CFHCF_2)_2I$ were tentatively identified. Several other possible isomeric products probably also occur in the product.

Likewise, the isomeric products $C_4F_9(C_2F_3H)_4I$ would have 16 possible isomers. At least three were present in the gas chromatogram but complete resolution probably did not occur. There were likewise several peaks in the chromatogram for $C_4F_9(C_2F_3H)_nI$, $n=5$, 6 and 7 but the individual isomeric products were not completely resolved.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments disclosed herein.

The embodiments of the invention in which an exclusive property or privilege is claimed are as follows:

1. A compound having the empirical formula $R_fIF_x$ wherein $R_f$ is a perfluoroalkyl group of from 2 to 22 carbon atoms and $x$ is an integer of 2 or 4.

2. The compounds of claim 1 wherein $R_f$ is $n=C_4F_9$ and $x$ is 2.

3. The compound of claim 1 wherein $R_f$ is $C_2F_5$ and $x$ is 2.

4. The compound of claim 1 where $R_f$ is $n\text{-}C_3F_7$ and $x$ is 2.

5. The compound of claim 1 wherein $R_f$ is $n=C_6F_{13}$ and $x$ is 2.

6. The compounds of claim 1 wherein $R_f$ is $$(CF_3)_2CF-$$

and $x$ is 2.

7. A process for preparing perfluoroalkyl iodide telomers which process comprises:

(A) contacting a perfluoroalkyl iodide of the formula $R_f'I$ with an olefin of the formula $(R^1)_2C=CR'R^2$ in the presence of an initiator having the empirical formula $R_fIF_x$ at a temperature of from about $-40°$ C. to about $140°$ C., and, (B) recovering product telomers of the structure $R'_f[C(R^1)_2CR^1R^2]_rI$ from the resulting reaction mixture;

said $R_f$ and $R'_f$ are each perfluoroalkyl groups of 2 to about 22 carbons; each $R^1$ is selected from the group consisting of H and F, $R^2$ is selected from the group consisting of H, F, polyfluoroalkyl and alkyl, with the proviso that the number of carbon atoms in the olefin is at most 5; $x$ is an integer of 2 or 4 and $r$ is an integer of at least one.

8. A process according to claim 7 wherein said olefin is a tetrafluoroethylene.

9. A process according to claim 7 wherein said initiator is $R_fIF_2$.

10. A process according to claim 7 wherein said initiator is $C_2F_5IF_2$.

11. A process according to claim 7 wherein said initiator is $C_4F_9IF_2$.

References Cited

UNITED STATES PATENTS 3,283,020  11/1966  Parsons _____ 260—653

DANIEL D. HORWITZ, *Primary Examiner.*